United States Patent

Farr

[11] Patent Number: 5,240,377
[45] Date of Patent: Aug. 31, 1993

[54] COMPOSITE FAN BLADE

[75] Inventor: Jeffrey D. Farr, Milford, Mich.

[73] Assignee: Williams International Corporation, Walled Lake, Mich.

[21] Appl. No.: 841,667

[22] Filed: Feb. 25, 1992

[51] Int. Cl.$^5$ ............................................. B63H 7/02
[52] U.S. Cl. ............................ 416/229 R; 416/230; 416/224
[58] Field of Search ............ 416/217, 224, 229 R, 416/229 A, 230, 248

[56] References Cited

U.S. PATENT DOCUMENTS

| | | | |
|---|---|---|---|
| 1,946,129 | 2/1934 | Cebulski | 416/224 |
| 2,796,215 | 6/1957 | Warnken | 416/248 |
| 2,868,439 | 1/1959 | Hampshire et al. | 416/230 |
| 2,929,755 | 3/1960 | Porter | 416/230 R |
| 3,737,250 | 6/1973 | Pilpel et al. | 416/248 |
| 4,966,527 | 10/1990 | Merz | 416/230 |
| 5,022,824 | 6/1991 | Violette et al. | 416/248 |
| 5,102,302 | 4/1992 | Schilling et al. | 416/224 |

*Primary Examiner*—Edward K. Look
*Assistant Examiner*—Mark Sgantzos
*Attorney, Agent, or Firm*—Lyman R. Lyon

[57] ABSTRACT

A composite fan blade comprises a blade portion (12) formed from a first set of unidirectional layers of fibers (110) wrapped around a wedge shape bushing (16). A blade platform (14) comprising a second set of unidirectional fiber layers (114) filled with a resin filler (116) is pressure molded with the blade (12) and bushing (16) to form a desired blade shape. The blade is then hinge mounted to a metallic blade support disk (18). The blade of the present invention provides a strong, lightweight fan blade for small, high speed propfan turbine engines.

7 Claims, 1 Drawing Sheet

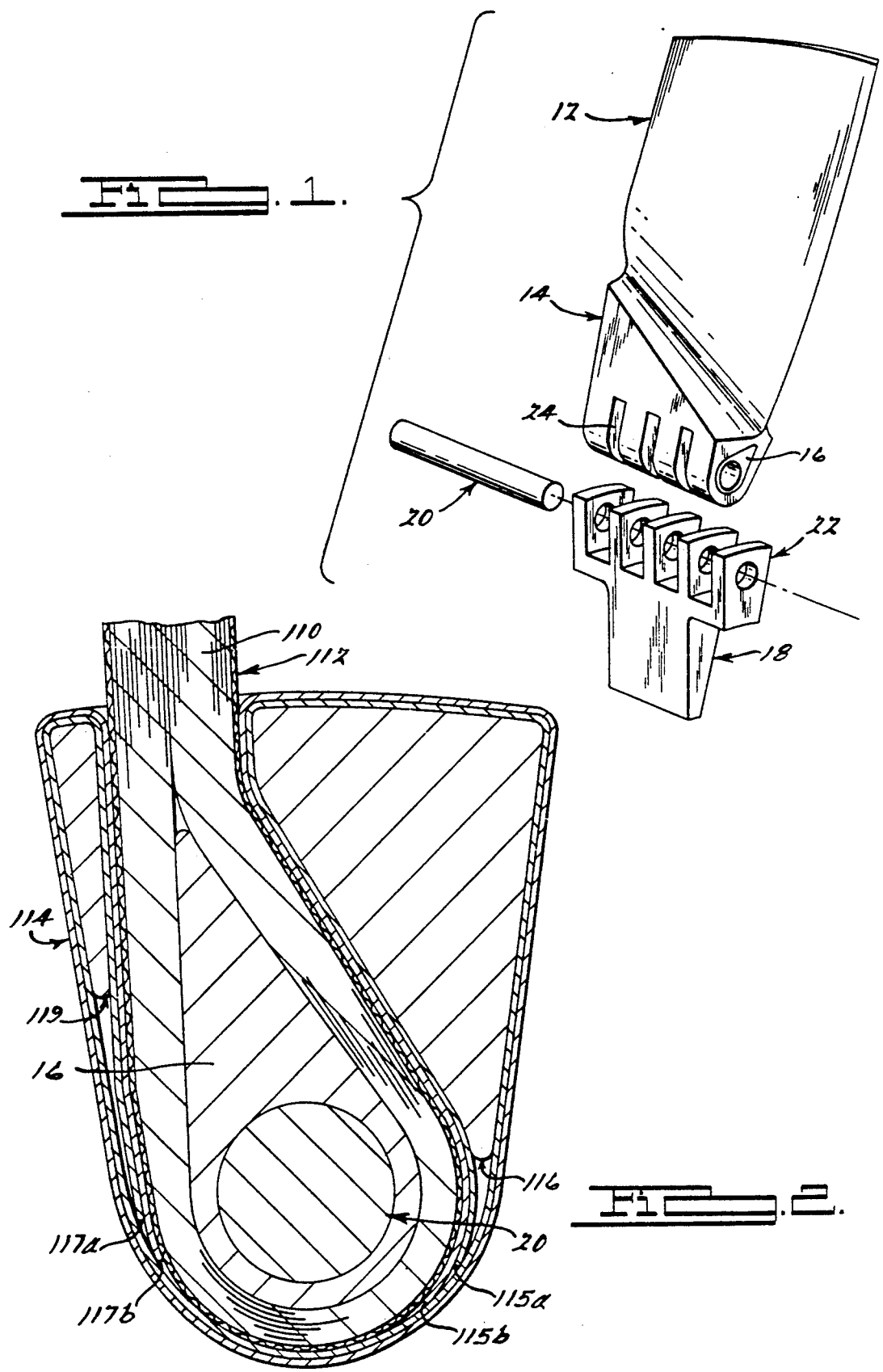

COMPOSITE FAN BLADE

BACKGROUND OF THE INVENTION

The present invention relates generally to propfans used in propulsion systems, and more particularly to fan blades in small, high speed propfan turbine engines.

Prior art turbine fan blades have generally been constructed entirely of metal which is cast or machined into an assembly to be powered by an engine drive mechanism. However, an all-metallic blade has the drawbacks of the blade tending to be heavy. The blade can also have a relatively low modulus/density ratio leading to reduced aerodynamic performance due to blade tip deflections and blade untwist.

One solution to this problem is to provide a fan blade of composite fiber construction. A composite fan blade has a lower weight and a greater modulus/density ratio than a metal blade. Reduced weight in a gas turbine engine component increases flight time and lowers inertial response time. A higher modulus/density ratio improves aerodynamic performance.

The strength of the composite material derives from the fibers utilized therein. A composite design must optimize the orientations of the fiber loading in order to achieve maximum benefit of the composite design. However, the problem inherent with a fan blade arrangement is the fan blade requires strength in the radial direction, and the fan support disk requires strength in the tangential direction. An integral composite fan design would thus require a very complicated three-dimensional fiber weave in order to tailor the fiber orientations to the structural requirements of the fan blade and support disk.

SUMMARY OF THE INVENTION

It is therefore an object of the present invention to provide an improved fan blade and method of making the same which reduces the weight of a turbine engine and increases engine performance.

It is another object of the present invention to provide a fan blade made of composite fibers which does not require complex orientation of the composite fibers to provide sufficient blade strength.

It is another object of the present invention to provide a method of making a composite fan blade which does not require complex orientation of the composite fibers to provide sufficient blade strength.

The present invention provides a composite fan blade comprising a metal support disk having a plurality of hinge lugs formed therein, a bushing means, and a fan blade formed from a first set of radially oriented unidirectional layers of fibers. The metal support disk is connected to an engine drive mechanism. The first set of layers of fibers are wrapped around the bushing means to form an elongated front side, an elongated back side, and a portion encompassing the bushing means. Further, a blade platform is formed from a second set of unidirectional layers of fibers wrapped around the portion of the fan blade encompassing the bushing means. The fan blade assembly formed by the blade platform, the blade and the bushing means has a plurality of hinge slots formed therein. A pin means extends through the hinge formed by the hinge lugs in the support disk and the hinge slots in the fan blade assembly for attaching the fan blade to the support disk.

The composite fan blade of the present invention further comprises a layer of cloth fiber wrapped around the outer surface of the fan blade, the layer of cloth fiber on the front side of the fan blade being stitched through the first set of unidirectional layers of fibers to the layer of cloth fiber on the back side of the fan blade.

The second set of unidirectional layers of fibers are wrapped around the fan blade to form support pockets for the portion of the fan blade encompassing the bushing means. A resin filler is placed in the support pockets. The fan blade assembly is pressure molded to form a desired blade shape.

The present invention will be more fully understood upon reading the following detailed description of the preferred embodiment in conjunction with the accompanying drawings.

BRIEF DESCRIPTION OF THE DRAWINGS

FIG. 1 shows a fan blade and disk arrangement in accordance with the present invention.

FIG. 2 shows a detailed cross-section of the fan blade/platform arrangement in accordance with the present invention.

DETAILED DESCRIPTION OF THE PREFERRED EMBODIMENT OF THE INVENTION

Referring to FIG. 1 there is shown a composite fan blade in accordance with the present invention having a blade 12 formed with a blade platform 14 fit around an integral wedge/bushing 16 for connection to a metallic blade support disk 18. The blade 12 is held to the disk by way of a pin 20 slid through a hinge formed by hinge lugs 22 and hinge slots 2 machined into the blade platform 14 and bushing 16. A suitable locking arrangement (not shown) can be used to assist in maintaining the blade 12 in a proper elevated position relative to the central axis of pin 20.

Referring to FIG. 2 there is shown a detailed cross-section of the composite fan blade/platform arrangement of the present invention. The blade 12 is formed from radially oriented unidirectional layers of fiber (e.g. carbon fiber) 110 wrapped around the integral wedge/bushing 16. For added strength and support, a layer of cloth fiber 112 is wrapped around the outside surface of the unidirectional fiber layers 110. The cloth fiber 112 on both outside surfaces of the blade are then stitched together through the unidirectional layers of fiber 110.

Platform 14 is formed by wrapping unidirectional layers of fibers 114 around the blade assembly encompassing the wedge/bushing 16. Unidirectional fiber layers 114 are wrapped to leave a desired size pocket on both sides of the blade assembly which are filled with a resin filler 116. More particularly, the ends 115 a and b, and 117 a and b of unidirectional fiber layers 114 are respectively wrapped around resin filler elements 116 and 119 to create the desired size support pockets. Once the pockets have been formed, the unidirectional fiber layers 114 are wrapped as a unit around the blade assembly encompassing the wedge/bushing 16 so as to orient the resin filled pockets against the front and back sides of the blade assembly encompassing the wedge/bushing 16. Once the unidirectional fiber layers 114 are applied, the blade/platform assembly is compression molded to form the desired blade shape. After compression molding is complete, hinge slots 24 are then machined into the blade/platform assembly (as noted hereinabove) to allow proper mounting to the metal support disk 18.

The composite fan blade of the present invention creates a significant reduction in overall weight in a small, high speed propfan turbine engine. This reduction in weight provides the benefits of increased flight time and lower inertial response time. The modulus/density ratio of the fan blade is also significantly increased due to the composite fiber layers having higher strength/lower weight than a fan blade of metal construction. A higher modulus/density ratio for the fan blade reduces tip deflections and blade untwist thereby improving aerodynamic performance. The present invention obviates the need for complicated fiber weaves to achieve proper fiber orientation through the attachment of the fan blade assembly to the metal support disk.

The composite fan blade of the present invention is also applicable to a folding fan blade arrangement such as disclosed in U.S. Pat. Nos. 4,936,526 and 4,979,876, assigned to the assignee of the present invention and incorporated by reference herein. In this type of folding arrangement, the fan blade 12 remains in a folded position during storage and launching, and automatically deploys for propulsion once airborne. This allows propfan turbine engines using a propeller having a large diameter to be used in small missile applications. U.S. Pat. No. 4,936,526 teaches hinging the propeller blade so that the blade can be folded to a position extending generally parallel to the thrust axis of the propulsion system. A hinge is provided near the blade root having a hinge line extending at a right angle to the axis of rotation of the blade. U.S. Pat. No. 4,979,876 teaches hinging the propeller blades to fold about an axis extending at an acute angle to the thrust axis of the propulsion system to a position extending generally laterally of said axis. The geometry of the folding mechanism is such that the hinge axis of the blades is essentially coextensive with the outside diameter of the missile. Since a propfan turbine engine can be made lighter with the composite fan blade of the present invention, the overall weight of a small missile can be reduced.

It will be understood that the foregoing description of the preferred embodiment of the present invention is for illustrative purposes only, and that the various structural and operational features herein disclosed are susceptible to a number of modifications and changes, none of which departs from the spirit and scope of the present invention as defined in the appended claims.

I claim:

1. A composite fan blade for a propfan engine comprising:
   a support disk having a plurality of hinge lugs formed therein, said disk being connected to an engine drive means;
   a bushing element;
   a fan blade formed from a first set of radially oriented unidirectional layers of fibers, said first set of layers of fibers being wrapped around said bushing element to form an elongated front side, an elongated back side, and a portion encompassing said bushing element;
   a blade platform formed from a second set of unidirectional layers of fibers having a first and a second end which are both wrapped around respective resin filler elements to form resin filled support pockets, said second set of unidirectional layers of fibers being wrapped around the portion of the fan blade encompassing said bushing element to place the resin filled support pockets against the portion of the fan blade encompassing said bushing element, wherein said fan blade and said blade platform form a fan blade assembly, said fan blade assembly having a plurality of hinge slots formed therein; and
   a pin element extending through the hinge formed by said plurality of hinge lugs in said support disk and said plurality of hinge slots in said fan blade assembly for attaching said fan blade assembly to said support disk.

2. The composite fan blade of claim 1 wherein said support disk is metallic.

3. The composite fan blade of claim 1 further comprising a layer of cloth fiber wrapped around the outer surface of said first set of unidirectional layers of fibers, said layer of cloth fiber extending between said fan blade and said blade platform, wherein said layer of cloth fiber on said front side of said fan blade is stitched through said first st of unidirectional layers of fibers to said layer of cloth fiber on said back side of said fan blade.

4. The composite fan blade of claim 1 wherein said fan blade assembly is pressure molded to form a desired blade shape.

5. A method of making a composite fan blade comprising the steps of:
   a) wrapping a fist set of radially oriented unidirectional layers of fibers around a bushing element to form an elongated front side, an elongated back side, and a portion encompassing said bushing element;
   b) wrapping a fist and second end of a second step of unidirectional layers of fibers around respective resin filler elements to form a resin filled support pocket at each end of said second set of unidirectional layers of fibers;
   c) wrapping said second set of unidirectional layers of fibers around said first set of layers of fibers such that the support pockets are placed against the portion of said first set of unidirectional layers of fibers encompassing said bushing element, thereby forming a fan blade assembly;
   d) forming a plurality of hinge slots in the bushing element, the portion of said first set of layers of fibers encompassing said bushing element, and said second set of layers of fibers; and
   e) attaching the fan blade assembly to a support disk having a plurality of hinge lugs formed therein by extending a pin element through a hinge formed by said plurality of hinge lugs in said support disk and said plurality of hinge slots in said fan blade assembly.

6. The method of claim 5 further comprising after step b) the steps of wrapping a layer of cloth fiber around said first set of unidirectional layers of fibers; and
   stitching said layer of cloth fiber on the elongated front side through said first set of unidirectional layers of fibers to said layer of cloth fiber on the elongated back side.

7. The method of claim 5 further comprising after step c) the step of pressure molding the fan blade assembly to form a desired blade shape.

* * * * *